United States Patent
Zanzig

(10) Patent No.: US 6,525,128 B2
(45) Date of Patent: *Feb. 25, 2003

(54) COMPOSITION OF ORGANOPHOSPHITE, ISOBUTYLENE COPOLYMER AND SILICA AND TIRE THEREOF

(75) Inventor: David John Zanzig, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 29 days.

This patent is subject to a terminal disclaimer.

(21) Appl. No.: 09/775,220

(22) Filed: Feb. 1, 2001

(65) Prior Publication Data

US 2002/0143084 A1 Oct. 3, 2002

(51) Int. Cl.$^7$ ................................................ C08K 3/34
(52) U.S. Cl. ..................... 524/492; 524/493; 524/495; 524/496; 524/128; 524/127; 152/209.5
(58) Field of Search ................................ 524/115, 117, 524/127, 128, 139, 145, 152, 492, 493, 495, 496; 525/332.5, 332.9, 333.4, 333.5

(56) References Cited

U.S. PATENT DOCUMENTS

| | | | | |
|---|---|---|---|---|
| 3,768,537 A | * | 10/1973 | Hess et al. .................... 152/330 |
| 3,994,742 A | * | 11/1976 | Russell et al. ............ 106/288 Q |
| 5,013,793 A | | 5/1991 | Wang et al. .................. 525/195 |
| 5,094,829 A | | 3/1992 | Krivak et al. ................. 423/339 |
| 5,283,285 A | * | 2/1994 | Akkapeddi et al. ............ 525/67 |
| 5,610,221 A | * | 3/1997 | Waddell et al. .............. 524/492 |
| 5,679,728 A | | 10/1997 | Kawazura et al. ........... 523/215 |
| 5,708,069 A | | 1/1998 | Burns et al. ................. 524/403 |
| 5,750,610 A | | 5/1998 | Burns et al. ................. 524/434 |
| 5,789,514 A | | 8/1998 | Burns et al. .................... 528/12 |
| 6,028,137 A | | 2/2000 | Mahmud et al. ............. 524/496 |
| 6,194,594 B1 | * | 2/2001 | Gorl et al. .................... 556/427 |
| 6,211,271 B1 | * | 4/2001 | Garro et al. ................. 524/269 |
| 6,248,808 B1 | * | 6/2001 | Sone et al. ................... 523/215 |

FOREIGN PATENT DOCUMENTS

| | | | | |
|---|---|---|---|---|
| EP | 1172405 | | 1/2002 | ............ C08K/9/04 |
| WO | 9812251 | | 3/1998 | ............ C08K/5/14 |
| WO | WO 99/31178 A1 | * | 6/1999 | ............ C08L/23/28 |

OTHER PUBLICATIONS

"A New Isobutylene Copolymer: Non–tire Uses"by D. Kruse and J. Fusco, *Rubber & Plastics News*, Feb. 1, 1993.
*Introduction to Organic Chemistry*, 2$^{nd}$ Edition by A. Steitwieser, Jr. and C. H. Heathcock; p. 829.
Pp. 36, 38 and 40 through 42, "Improved Traction with BIMS" by W. H. Wadell,et al. *Rubber World*. Abstract XP–008004957, vol. 222, No. 6, 2000.

* cited by examiner

Primary Examiner—Edward J. Cain
Assistant Examiner—Katarzyna W Lee
(74) Attorney, Agent, or Firm—Henry C. Young, Jr.

(57) ABSTRACT

This invention relates to a rubber composition comprised of a halogenated (e.g. brominated) copolymer of isobutylene and p-methyl styrene elastomer reinforced with synthetic particulate silica-based reinforcement together with an organo phosphite to aid in enhancing the silica reinforcement of the halogenated isobutylene copolymer elastomer. Preferably, the rubber composition is comprised of a combination of a brominated copolymer of isobutylene and p-methyl styrene and at least one diene-based elastomer. The invention further relates to an article of manufacture, including a tire, having at least one component comprised of such rubber composition.

17 Claims, No Drawings

COMPOSITION OF ORGANOPHOSPHITE, ISOBUTYLENE COPOLYMER AND SILICA AND TIRE THEREOF

FIELD OF THE INVENTION

This invention relates to a rubber composition comprised of a halogenated (e.g. brominated) copolymer of isobutylene and p-methyl styrene elastomer reinforced with synthetic particulate silica-based reinforcement together with an organo phosphite to aid in enhancing the silica reinforcement of the halogenated isobutylene copolymer elastomer. Preferably, the rubber composition is comprised of a combination of a brominated copolymer of isobutylene and p-methyl styrene and at least one diene-based elastomer. The invention further relates to an article of manufacture, including a tire, having at least one component comprised of such rubber composition

BACKGROUND FOR THE INVENTION

Rubber compositions based upon sulfur curable diene derived elastomers which contain carbon-to-carbon double bond unsaturation in their elastomer backbone are usually reinforced with carbon black. However, they are sometimes reinforced with a combination of carbon black and synthetic silica particles. In some cases, it might be desired to use only silica reinforcement in the absence of carbon black.

A coupling agent is often used for such silica-containing rubber compositions to aid in enabling the silica to reinforce the rubber composition. Widely used coupling agents for such purpose are comprised of a moiety (e.g. an alkoxysilane moiety) which is reactive with hydroxyl groups (e.g. silanol groups) on the surface of the silica and another moiety (e.g. a polysulfide moiety) which is interactive with unsaturated elastomers which contain carbon-to-carbon double bonds in their elastomer backbone. Such silica coupling agent activity is believed to be well known to those skilled in such art.

However, saturated elastomers, which inherently do not have carbon-to-carbon double bond in their backbone, such as halogenated (e.g. brominated) copolymers of isobutylene and p-methyl styrene elastomers inherently do not respond to sulfur bonding or crosslinking in the manner of unsaturated diene-based elastomers.

Accordingly, coupling agents for the silica which rely upon an interaction with diene-based elastomers which contain carbon-to-carbon double bonds unsaturation in their backbone, namely polysulfide based couplers such as, for example bis(3-alkoxysilylalkyl) polysulfides, are considered herein to have limited value for coupling the silica to the elastomer, even when the rubber composition contains a diene hydrocarbon based elastomer, wherein the rubber composition has an appreciable amount of an elastomeric brominated copolymer of isobutylene and p-methyl styrene.

In practice, the aforesaid saturated halogenated copolymer elastomer might be prepared, for example, by first copolymerizing isobutylene and p-methyl styrene. Usually a ratio of isobutylene to p-methyl styrene in a range of about 50/1 to about 7/1 is used. The resulting copolymer is then halogenated with a halogen such as bromine which occurs at the paramethyl position, yielding a benzyl bromide functionality. The degree of bromination can typically be varied from about 0.5 to about 2.5, usually preferably about 1.5 to about 2.5, weight percent, based upon the copolymer of isobutylene and p-methyl styrene.

The following reference provides additional information relating to the preparation of such halogenated copolymers:

"A New Isobutylene Copolymer; Non-tire Uses" by D. Kruse and J. Fusco, *Rubber & Plastics News*, Feb. 1, 1993.

Such brominated copolymer of isobutylene and p-methyl styrene may, for example, have an unvulcanized physical property such as a Mooney viscosity value (ML(1+8)) at 125° C. in a range of about 35 to about 60 and a Tg in a range of about −50° C. to about −60° C.

It is to be appreciated that such halogenated (e.g. brominated) copolymer elastomer has a completely saturated backbone as being devoid of carbon-to-carbon double bond unsaturation and therefore is uniquely useful for a rubber composition where stability of various of its physical properties desired when the rubber composition is exposed to atmospheric conditions which conventionally attack unsaturated diene-based elastomers and particularly influences of oxidation and ozone attack.

However, the utility for such halogenated saturated elastomers is limited because, as hereinbefore discussed, because of its lack of carbon-to-carbon double bonds, it is not considered as being reactive with sulfur and is therefore not ordinarily considered as being sulfur curable in a sense of diene hydrocarbon-based elastomers.

Historically, some organo phosphites have previously been recognized as being reactive with alkyl halides. For example, see *Introduction to Organic Chemistry*, $2^{nd}$ Edition, by A. Steitwieser, Jr., and C. H Heathcock, Page 829, which refers to a Arbuzov-Michaelis reaction of a phosphite with an alkyl halide.

It is contemplated herein to apply such indicated alkyl halide activity of organo phosphites for enhancing the utilization of silica reinforcement of rubber compositions which contain a halogenated copolymer of isobutylene and p-methyl styrene.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with this invention, a rubber composition comprises, based upon parts by weight of ingredient per 100 parts by weight elastomer(s), phr:

(A) 100 phr of elastomer comprised of
  (1) about 5 to about 100, alternately about 10 to about 50, phr of a halogenated copolymer of isobutylene and p-methyl styrene, wherein said halogen is selected from bromine or chlorine, preferably bromine,
  (2) from zero to about 95, alternately about 50 to about 90, phr of at least one diene-based elastomer and
(B) about 10 to about 100, optionally about 15 to about 90, phr of particulate reinforcing filler comprised of
  (1) from zero to about 100, alternately about 10 to about 85, phr of synthetic amorphous silica aggregates and, correspondingly,
  (2) from zero to about 75, alternately about 5 to about 60 phr of at least one of carbon black and silica treated carbon black having domains of silica on its surface;
  wherein said silica aggregates and said silica domains on the surface of said treated carbon black contain hydroxyl groups (e.g. silanol groups) on their surface; and (C) 0.5 to 25, preferably 1 to 15, phr of an organo phosphite as a coupling agent selected from at least one of organo diphosphites selected from diisodecyl pentaerythritol diphosphite, distearyl pentaerythritol diphosphite and pentaerythritol diphosphite and organo monophosphites selected from the general formulas:

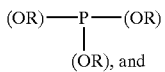  (I)

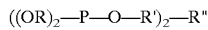  (II)

wherein each R radical is independently selected from alkyl radicals and phenyl radicals and alkyl substituted phenyl radicals; wherein said R alkyl radicals have from 1 to 18 carbon atoms, preferably from 1 through 4 or from 4 through 12, carbon atoms, and preferably selected from methyl, ethyl, propyl radicals, from propyl, butyl, octyl and ethylhexyl radicals or from phenyl radicals; wherein said alkyl radicals for said alkyl substituted phenyl radicals have from 3 to 9 carbon atoms, wherein R' is a phenyl radical; and wherein R" is selected from alkyl radicals having from 2 to 8 carbon atoms preferably selected from ethyl, propyl and butyl radicals;

wherein said organo phosphite is preferably selected from the organo phosphites of said formula (I);

wherein said organo phosphite is provided by one or more of the following:
  (1) by mixing said organo phosphite with said elastomer(s) and said particulate reinforcing filler preferably in an internal rubber mixer,
  (2) by pre-reacting said halogenated copolymer of isobutylene and p-methyl styrene with said organo phosphite prior to blending said reinforcing filler therewith,
  (3) by pre-reacting said organo phosphite with an aqueous dispersion of colloidal silica particles from which a precipitated silica is recovered to form an organo phosphite/silica composite thereof,
  (4) by mixing said organo phosphite with said elastomer(s) and said synthetic silica according to any of said steps (1), (2) or (3), wherein said synthetic silica includes at least one of said pre-hydrophobated silica aggregates which has been pre-hydrophobated prior to mixing with said elastomers, with an alkylsilane of the general formula (III):
  (5) by mixing said organo phosphite with said elastomer(s) and an alkylsilane of the said Formula (III) with said elastomer(s) and said synthetic silica, and
  (6) by pre-reacting said organo phosphite and said alkylsilane of Formula (III) with
    (a) said aggregates of synthetic precipitated silica or
    (b) an aqueous dispersion of colloidal silica particles from
  which a precipitated silica is recovered to form a silica composite thereof.

In the practice of this invention, said rubber composition may also contain an additional coupling agent as, for example, an alkoxysilyl polysulfide such as for example, a bis(3-trialkoxysilylalkyl)polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or from 3.5 to 4, sulfur atoms in its polysulfidic bridge.

Representative of such other coupling agents are, for example, bis(3-triethoxysilylpropyl) polysulfide having an average of from 2 to 2.6 or from 3.5 to 4, sulfur atoms in its polysulfidic bridge.

Such additional coupling agent may, for example, be added directly to the elastomer mixture or may be added as a composite of precipitated silica and such coupling agent formed by treating a precipitated silica therewith or by treating a colloidal silica therewith and precipitating the resulting composite.

In further accordance with this invention, an article of manufacture is provided which contains at least one component comprised of the rubber composition of this invention.

In additional accordance with this invention, a tire is provided which contains at least one component comprised of the rubber composition of this invention.

In further accordance with this invention, a tire is provided having a tread comprised of the rubber composition of this invention.

A significant aspect of this invention is the use of a reaction product of said organo phosphite and a said halogenated (preferably brominated) copolymer of isobutylene and p-methyl styrene in order to improve the polymer (e.g. elastomer) to filler interaction (via reaction of the organo phosphite with the halogen of the halogenated copolymer of isobutylene and p-methyl styrene) to thereby enhance resulting rubber composition properties leading to enhanced tire component (e.g. tire tread) properties including aged performance such as, for example durability and/or stability properties.

Representative examples of organo phosphites understood to be commercially available are, for example for example, triisodecyl phosphite, trilauryl phosphite, tris (tridecyl) phosphite, diphenyl isooctyl phosphite, diphenyl isodecyl phosphite, phenyl diisodecyl phosphite, triphenyl phosphite, triisononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, as well as tris (2,4-dit-butylphenyl) phosphite, and bis 2,4,6,tri-t-butylphenyl 2-butyl-2-ethyl-1,3-propanediol phosphite; and diphosphites as, for example, distearyl pentaerythritol diphosphite, bis (2,4-di-t-butylphenyl) pentaerythritol diphosphite, bis (2,6, di-t-butyl-4-methylphenyl) pentaerythritol diphosphite, bis (2,4-dicumylphenyl) pentaerythritol diphosphite and mixtures thereof. Such organo phosphite may be, for example, tris (2-ethylhexyl) phosphite or triphenyl phosphite.

In practice, the synthetic amorphous silica may be selected from aggregates of precipitated silica, which is intended to include precipitated aluminosilicates as a co-precipitated silica and aluminum, and from fumed (pyrogenically formed) silica.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The silica treated carbon black relates to carbon black which contains domains of exposed silica on the surface of the carbon black. Such carbon black may be prepared, for example, by reaction of an alkyl silane (e.g. an alkoxy silane) with carbon black or by co-fuming carbon black and silica at an elevated temperature. For example, see U.S. Pat. Nos. 5,679,728 and 6,028,137.

In the further practice of the invention, the aforesaid in situ reaction of said organo phosphite silica material within the elastomer host via said internal rubber mixing process is accomplished wherein said silica material is a precipitated silica and/or silica-containing carbon black which is hydrophobated prior to its addition to the elastomer (pre-hydrophobated). Such in situ reaction is considered herein to be important as to both the process of mixing and reacting of the organo phosphite and pre-hydrophobated silica material as to a resulting product thereof. In particular, is it considered herein that pre-hydrophobation of the silica material, particularly with an alkyl silane of the general formula (III) enables a more efficient mixing, or processing, of it within the elastomer host in that such pre-hydrophobation of the silica material (A) renders it more compatible with the diene-based elastomer and
(B) substantially reduces a tendency for a precipitated silica to agglomerate with itself within the elastomer host.

In the practice of this invention, said pre-hydrophobated precipitated silica aggregates may be pre-hydrophobated, for example, by treating silica in an aqueous colloidal form thereof with said alkylsilane of Formula (III).

The hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to U.S. Pat. Nos. 5,094,829 as well as 5,708,069, 5,789,514 and 5,750,610 for a more detailed discussion.

Representative alkylsilanes of Formula (III) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), high vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers. The brominated poly(isobutylene-co-para-methylstyrene) polymer may be obtained, for example, as Exxpro 3745, a trademark of the ExxonMobil Chemical Company.

In the further practice of this invention, particulate reinforcement for the rubber composition may be particulate synthetic amorphous silica, or a combination of carbon black and amorphous silica (exclusive of silica treated carbon black), usually of an amount in a range of about 25 to about 100 alternately about 35 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm$^3$/100 g, and more usually about 100 to about 300 cm$^3$/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from J. M. Huber Corporation as Zeopol 8745 and Zeopol 8715, silicas from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulflur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization an organo phosphite for enhancing reinforcement of a halogenated (e.g. brominated) poly (isobutylene-co-para-methylstyrene) polymer with a particulate synthetic amorphous silica material which contains hydroxyl groups (e.g. silanol groups) on its surface.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and coupling agent, are mixed in one or more non-productive mix stages. The terms "non-productive" and "productive" mix stages are well known to those having skill in the rubber mixing art.

EXAMPLE I

Samples A and B are reported herein as rubber samples which contain a brominated copolymer of isobutylene and para-methyl stryene rubber (also referred to as "BIMS" rubber) as well as at least one diene-based elastomer and silica reinforcement. Sample B also contained an organo phosphite, namely triphenyl phosphite, as a coupling agent for said BIMS.

For the Samples A and B, a total of three non-productive mixing steps were used for the silica reinforced rubber compositions. The rubber compositions were dumped from the rubber mixer after each mixing step, sheeted out from an open mill and allowed to cool to below 40° C. after each mixing step.

The representative rubber compositions shown are in the following Table 1 where the Samples A and B utilized the silica reinforcement together with a paraffinic rubber processing oil, non-staining phenolic antioxidant.

The non-productive mixing steps were for about 5 minutes to a temperature of about 160° C. The productive mixing step was for about 2 minutes to a temperature of about 115° C.

Table 1 illustrates the ingredients used for preparing the rubber compositions of Samples A and B.

TABLE 1

|  | Sample A | Sample B |
| --- | --- | --- |
| First Non-Productive Mixing Step (to 160° C.) | | |
| BIMS rubber[1] | 40 | 40 |
| Polybutadiene rubber[2] | 30 | 30 |
| Polyisoprene rubber | 30 | 30 |
| Silica[3] | 66 | 66 |
| Paraffinic processing oil | 25 | 25 |
| Phosphite[4] | 0 | 10 |
| Second Non-Productive Mixing Step (160° C.) | Yes | Yes |
| Zinc Oxide | 2.5 | 2.5 |
| Antidegradants[8] | 3.0 | 3.0 |
| Carbon black[6] | 10 | 10 |
| Productive Mixing Step (to 115° C.) | | |
| Accelerator(s)[7] | 3.5 | 3.5 |
| Sulfur | 2.2 | 2.2 |

[1]Brominated copolymer of isobutylene and para-methyl stryene rubber obtained as Exxpro 3745 from The Exxon Mobil Chemical Company
[2]Cis 1,4-polybutadiene rubber obtained as Budene 1207 from The Goodyear Tire & Rubber Company
[3]Obtained as Zeopol ® 8715 from the J. M. Huber Corporation
[4]Triphenyl phosphite
[5]P-phenylenediamine type
[6]N472 carbon black, an ASTM designation, obtained as Vulcan XC-72 from Cabot Corporation
[7]Sulfenamide and diphenylguanidine or tetramethylthiuram disulfide type
[8]Mixed diaryl-p-phenylenediamine type antioxidant from The Goodyear Tire & Rubber Company An aromatic rubber processing oil was used which can be characterized as 40 percent to 41 percent aromatic, 21 percent to 26 percent naphthenic and 34 percent to 38 percent paraffinic. A paraffinic rubber processing oil was used which can be characterized as 46 percent to 51 percent paraffinic, 36 percent to 42 percent naphthenic and 11 percent to 14 percent aromatic.

The rubber compositions of Table 1 were cured for about 14 minutes at about 160° C. Various resulting physical properties are shown in the following Table 4.

TABLE 2

|  | Sample A | Sample B |
|---|---|---|
| Stress Strain (Modulus) | | |
| 100% modulus (MPa) | 1.6 | 1.2 |
| 300% modulus (MPa) | 8.5 | 4.8 |
| Tensile strength (MPa) | 11.5 | 10.9 |
| Elongation at break, (%) | 417 | 617 |
| Energy, J | 83.7 | 127.2 |
| Rebound | | |
| 23° C. | 44 | 33 |
| 100° C. | 67 | 49 |
| Hardness | | |
| Shore A, 23° C. | 58 | 62 |
| Shore A, 100° C. | 51 | 51 |
| DIN Abrasion (10 N force) (cm³ loss) | 172 | 132 |
| Peel Adhesion (95° C.), N | 38 | 159 |

From Table 2 it is seen that tear strength, as measured in a peel adhesion test, and abrasion resistance of Sample B are improved as compared to Sample Z which is indicative of improved durability of the rubber composition.

While various embodiments are disclosed herein for practicing the invention, it will be apparent to those skilled in this art that various changes and modifications may be made therein without departing from the spirit or scope of the invention.

What is claimed is:

1. A rubber composition which comprises, based upon parts by weight of ingredient per 100 parts by weight elastomer(s), (phr):

(A) 100 phr of elastomer comprised of
  (1) about 5 to about 100 phr of a halogenated copolymer of isobutylene and p-methyl styrene, wherein said halogen is selected from bromine or iodine,
  (2) from zero to about 95 phr of at least one diene-based elastomer and
(B) about 10 to about 100 phr of particulate reinforcing filler comprised of
  (1) from zero to about 100 phr of synthetic amorphous silica aggregates and, correspondingly,
  (2) from zero to about 75 phr of at least one of carbon black and silica treated carbon black having domains of silica on its surface;
wherein said silica aggregates and said silica domains on the surface of said treated carbon black contain hydroxyl groups on their surface; and
(C) 0.5 to 25 phr of an organo phosphite as a coupling agent selected from at least one of organo diphosphites selected from diisodecyl pentearythritol diphosphite, distearyl pentearythritol diphosphite and pentearythritol diphosphite and organo monophosphites selected from the general formulas:

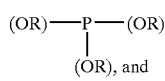

(I)

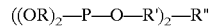

(II)

wherein each R radical is independently selected from alkyl radicals and phenyl radicals and alkyl substituted phenyl radicals; wherein said R alkyl radicals have from 1 to 18 carbon atoms, preferably from 1 through 4 or from 4 through 8, carbon atoms, and preferably selected from methyl, ethyl, propyl radicals, from propyl, butyl, octyl and ethylhexyl radicals or from phenyl radicals; wherein said alkyl radicals for said alkyl substituted phenyl radicals have from 3 to 9 carbon atoms, wherein R' is a phenyl radical and
wherein R" is selected from alkyl radicals having from 2 to 8 carbon atoms preferably selected from ethyl, propyl and butyl radicals;
wherein said organo phosphite is provided by one or more of the following:
  (1) by mixing said organo phosphite with said elastomer(s) and said synthetic silica particulate reinforcement,
  (2) by pre-reacting said halogenated copolymer of isobutylene and p-methyl styrene with said organo phosphite prior to blending said reinforcing filler therewith,
  (3) by pre-reacting said organo phosphite with an aqueous dispersion of colloidal silica particles from which a precipitated silica is recovered to form an organo phosphite/silica composite thereof,
  (4) by mixing said organo phosphite with said elastomer(s) and said synthetic silica according to any of said steps (1), (2) or (3), wherein said synthetic silica includes at least one of said pre-hydrophobated silica aggregates which has been pre-hydrophobated prior to mixing with said elastomers, with an alkylsilane of the general formula (III):

(III)

wherein X is a radical selected from alkoxy radicals having from 1 through 3 carbon atoms, preferably selected from methoxy and ethoxy radicals, and from halogen radicals selected from at least one of chlorine and bromine radicals, preferably a chlorine radical; R is an alkyl radical having from 1 to 18 carbon atoms, preferably from 1 through 4 carbon atoms and more preferably selected from methyl and ethyl groups; and n is an integer of 1 through 3,
  (5) by mixing said organo phosphite with said elastomer(s) and an alkylsilane of the said Formula (III) with said elastomer(s) and said synthetic silica, and
  (6) by pre-reacting said organo phosphite and said alkylsilane of Formula (III) with
    (a) said aggregates of synthetic precipitated silica or
    (b) an aqueous dispersion of colloidal silica particles from which a precipitated silica is recovered to form a silica composite thereof.

2. The rubber composition of claim 1 wherein said rubber composition contains an additional coupling agent as a bis(3-trialkoxysilylalkyl) polysulfide wherein alkyl radicals for said alkoxy groups are selected from one or more of methyl and ethyl radicals and the alkyl radical for said silylalkyl component is selected from butyl, propyl and amyl radicals and wherein said polysulfide component contains from 2 to 8, with an average of from 2 to 2.6 or from 3.5 to 4, sulfur atoms in its polysulfidic bridge.

3. The rubber composition of claim 1 wherein said additional coupling agent is added directly to the elastomer mixture or is added as a composite of precipitated silica and said coupling agent formed by treating a precipitated silica therewith or by treating a colloidal silica therewith and precipitating the resulting composite.

4. The rubber composition of claim 1 wherein said organo phosphite is of the general formula (I).

5. The rubber composition of claim 1 wherein said organo phosphite is selected from at least one of triisodecyl phosphite, trilauryl phosphite, tris(tridecyl) phosphite, diphenyl isooctyl phosphite, diphenyl isodecyl phosphite, phenyl diisodecyl phosphite, triphenyl phosphite and tri-isononylphenyl phosphite, tris (2,4-dit-butylphenyl) phosphite, distearyl pentaerythritol diphosphite, bis (2,4-di-t-butylphenyl) pentaerythritol diphosphite, bis (2,6,di-t-butyl-4-methylphenyl pentaerythritol diphosphite, bis (2,4-dicumylphenyl)pentaerythritol diphosphite and bis 2,4,6,tri-t-butylphenyl 2-butyl-2-ethyl-1,3-propanediol phosphite, trimethyl phosphite, triethyl phosphite, tris (2-chloroethyl) phosphite, triisopropyl phosphite, tributyl phosphite, tri-isooctyl phosphite and tris (2-ethylhexyl)phosphite and mixtures thereof.

6. The rubber composition of claim 1 wherein said organo phosphite is selected from tris(2-ethylhexyl)phosphite and triphenyl phosphite.

7. The rubber composition of claim 1 wherein said silica-based filler is (A) a synthetic amorphous silica selected from aggregates of precipitated silica and fumed silica, or (B) a combination of aggregates of participated silica and carbon black.

8. The rubber composition of claim 1 wherein said organo phosphite is reacted with the surface of said silica and/or silica treated carbon black in situ within the elastomer host.

9. The rubber composition of claim 1 wherein said organo phosphite together with a hydrophobating agent of the said general formula (III) are reacted with the surface of said silica and/or silica treated carbon black in situ within the elastomer host.

10. The rubber composition of claim 1 wherein said organo phosphite is provided as a pre-formed composite, prior to addition to said elastomer, of said precipitated silica and said organo phosphite.

11. The rubber composition of claim 10 wherein said pre-formed composite is formed by (A) by reaction of the organo phosphite with the aggregates of the precipitated silica or (B) by reaction of the organo phosphite with the formative colloidal silica particles prior or during their aggregation in the silica precipitation process.

12. The rubber composition of claim 11 wherein said pre-formed composite is reacted with a hydrophobating agent of the said general formula (II) in situ within the elastomer host.

13. The rubber composition of claim 1 wherein said pre-formed composite is formed (A) by reaction of said organo phosphite and/or hydrophobating agent with the aggregates of the precipitated silica or (B) by reaction of the organo phosphite and/or hydrophobating agent of the said general formula (III) with the formative colloidal silica particles prior or during their aggregation in the precipitation process.

14. The rubber composition of claim 1 wherein said diene-based elastomer(s) is selected from homopolymers and copolymers of monomers selected from isoprene and 1,3-butadiene and copolymers of at least one diene selected from isoprene and 1,3-butadiene and a vinyl aromatic compound selected from styrene and alphamethyl styrene.

15. An article of manufacture which contains at least one component comprised of the rubber composition of claim 1.

16. A tire which contains at least one component comprised of the rubber composition of claim 1.

17. A tire having a tread comprised of the rubber composition of claim 1.

* * * * *